United States Patent [19]

Shi

[11] Patent Number: 5,486,406
[45] Date of Patent: Jan. 23, 1996

[54] GREEN-EMITTING ORGANOMETALLIC COMPLEXES FOR USE IN LIGHT EMITTING DEVICES

[75] Inventor: Song Q. Shi, Phoenix, Ariz.

[73] Assignee: Motorola, Schaumburg, Ill.

[21] Appl. No.: 334,999

[22] Filed: Nov. 7, 1994

[51] Int. Cl.$^6$ .................................................. B32B 9/00
[52] U.S. Cl. ........................ 428/209; 428/457; 428/917; 313/504; 252/301.16; 252/301.22
[58] Field of Search .................................. 428/457, 209, 428/690, 917; 313/504; 252/301.16, 301.22

[56] References Cited

U.S. PATENT DOCUMENTS

| 3,803,135 | 4/1974 | Crounse | 252/301.22 |
| 5,104,740 | 4/1992 | Shinkai | 428/457 |
| 5,294,870 | 3/1994 | Tang | 313/504 |

OTHER PUBLICATIONS

Junji Kudo et al., 1,2,4–Triazole Derivative as an Electron Transport Layer in Organic Electroluminescent Devices, Jpn. J. Appl. Phys. vol. 32 (1993) pp. L917–L920, Part 2, No. 7A, 1 Jul. 1993.

*Primary Examiner*—Patrick J. Ryan
*Assistant Examiner*—Patrick R. Jewik
*Attorney, Agent, or Firm*—Eugene A. Parsons

[57] ABSTRACT

A new class of organometallic complexes for use in electroluminescent (EL) devices and a method of preparation are disclosed. The organometallic complexes are prepared by mixing organic ligands with metal salts in the presence of a base and a layer is formed in an EL device by vacuum evaporation. The organometallic material in the EL device serves as either an electron transporting layer or a light emission layer, or both.

5 Claims, 1 Drawing Sheet

GREEN-EMITTING ORGANOMETALLIC COMPLEXES FOR USE IN LIGHT EMITTING DEVICES

FIELD OF THE INVENTION

This invention relates to organic electroluminescent materials used in devices such as light emitting diodes.

BACKGROUND OF THE INVENTION

Organic electroluminescent (EL) devices are ideal candidates for use in portable display applications because of their low power drain and capability of a full range of colors.

A typical device consists of thin layers of organic molecules sandwiched between transparent and metallic electrodes. Under an applied bias, oppositely charged carriers are injected from the opposing contacts and are driven through the device by the electric field. Some of these oppositely charged carriers capture one another within the emissive layer to give out light at a wavelength corresponding to the energy gap of the organic emissive materials. In order to achieve high EL efficiency, it is necessary to balance the rates of injection of electrons and holes from opposite contacts into the device. In most case, the electron injection has proved to be more difficult then hole injection because of the relative large energy barrier existing at the n-contact and organic interface. To lower the energy barrier for efficient electron injection, often metals with low work function such as calcium, magnesium, etc. are needed as the electron-injecting contact. An alternative way to lower the energy barrier for efficient electron injection is to use an organic material of high electron affinity at the metal-organic interface. An organic material of high electron affinity has low "Lowest-Unoccupied-Molecular-Orbit" (LUMO) energy level that reduces the energy barrier for electron injection at the metal-organic interface, thus increasing the electron injection rate, resulting in a device of high efficiency and low working voltage.

In the prior art, a class of organic materials that have exhibited high EL efficiency in devices, are those based on metal complexes of 8-hydroxyquinoline and its derivatives (Vanslyke et al U.S. Pat. Nos. 4,539,507; 5,150,006). Another class of organometallic complexes that have also resulted in highly efficient organic EL devices is disclosed in a copending U.S. Patent Application entitled "NEW ORGANOMETALLIC COMPLEXES FOR USE IN LIGHT EMITTING DEVICES", filed 12 Sep. 1994, bearing Ser. No. 08/304,451, and assigned to the same assignee.

It is a purpose of this invention to provide a class of new organometallic complexes with high electron affinities for use in light emitting devices.

It is another purpose of the present invention to provide a class of new organometallic complexes for emission in the green range in light emitting devices.

It is a further purpose of this invention to provide preparation methods for the disclosed organometallic complexes for use in light emitting devices.

SUMMARY OF THE INVENTION

The above problems and others are at least partially solved and the above purposes and others are realized in a new class of organometallic complexes having the following general formula:

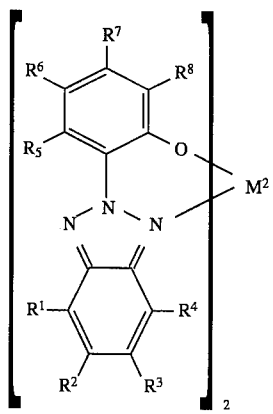

where:

$M^2$ is a divalent metal; and $R^1$ to $R^8$ represent substitution possibilities at each position and each represents hydrogen or hydrocarbon groups or functional groups.

In addition, the preparation of the new class of organometallic complexes is novel and the complexes are utilized as either an electron transporting layer or an active emissive layer, or both in organic electroluminescent devices.

BRIEF DESCRIPTION OF THE DRAWINGS

Referring to the drawings.

DESCRIPTION OF THE PREFERRED EMBODIMENTS

The present invention is directed to a class of new organometallic complexes for use in organic light emitting devices which, in general, consist of thin layers of organic molecules sandwiched between transparent and metallic electrodes.

Figure 1:
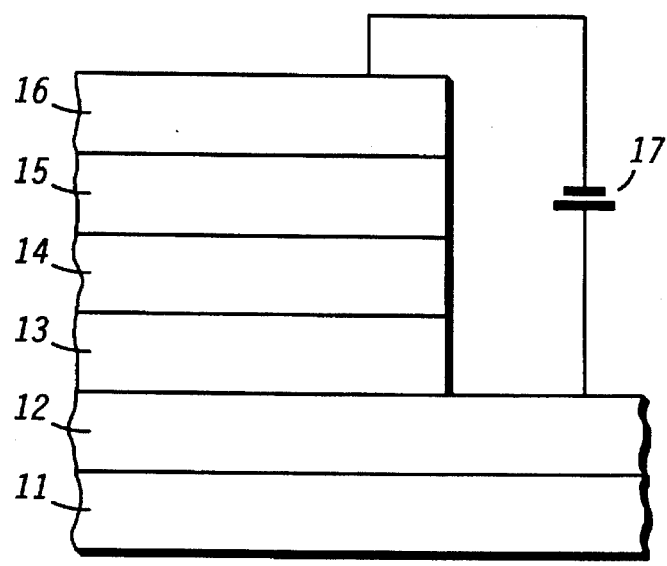
FIG. 1 is a simplified sectional view of an organic EL device in accordance with the present invention.

FIG. 1 illustrates a simplified cross-sectional view of one embodiment of an organic EL device 10 incorporating the present invention. Organic EL device 10 includes a substrate 11 which in this specific embodiment is a glass plate having a relatively planar upper surface. An electrically conductive layer 12 is deposited on the planar surface of substrate 11 so as to form a relatively uniform electrical contact. A first organic layer 13 of hole transporting material is deposited on the surface of conductive layer 12. A second organic layer 14 of emissive material is deposited onto first organic layer 13. Then a third organic layer 15 of electron transporting material is deposited on the surface of layer 14 and a second electrically conductive layer 16 is deposited on the upper surface of third organic layer 15 to form a second electrical contact.

While it should be understood that light generated within second organic layer 14 can be emitted either through first organic layer 13, conductive layer 12 and substrate 11 or through third organic layer 15 and second conductive layer 16, in the present embodiment, substrate 11 is formed of glass and conductive layer 12 is formed of organic or inorganic conductors, such as conductive polyaniline (PANI), indium-tin-oxide (ITO), which are substantially transparent to visible light so that the emitted light exits downwardly through substrate 11 in FIG. 1.

Further, in this embodiment, conductive layer 16 is formed of any of a wide range of metals or alloys in which at least one metal has a work function less than 4.0 eV. By the proper selection of material for conductive layer 16, the work functions of the materials making up layers 15 and 16 are substantially matched to reduce the required operating voltage and improve the efficiency of organic LED 10. Additional information on work function matching is disclosed in a copending U.S. Patent Application entitled "Organic LED with Improved Efficiency", filed 12 Sep. 1994, bearing Ser. No. 08/304,454, and assigned to the same assignee.

Also, in FIG. 1 organic EL device 10 has a potential applied between layers 12 and 16 by means of a potential source 17. In this embodiment conductive layer 12 is a p-type contact and conductive layer 16 is an n-type contact. The negative terminal of potential source 17 is connected to conductive layer 16 and the positive terminal is connected to conductive layer 12. Electrons injected from the n-type contact (layer 16) are transported through organic layer 15 and into organic layer 14 (the emissive layer). Holes injected from the p-type contact (layer 12) are transported through organic layer 13 and into organic layer 14 (the emissive layer), where upon an electron and a hole recombination a photon is emitted.

Organic layer 13 includes any known hole transporting organic molecules, such as aromatic tertiary amines (U.S. Pat. No. 5,150,006) and/or hole transporting polymers such as poly(phenylene vinylene), and is used to transport holes into organic layer 14 and confine electrons in organic layer 14. Organic layer 15, includes any known electron transporting materials, such as tris(8-hydroxyquinolino)aluminum (U.S. Pat. No. 4,539,507) and the complexes disclosed in the present invention. Organic layer 15 is used to transport electrons into organic layer 14 and confine holes within organic layer 14. Thus the holes and electrons have a maximum opportunity to recombine in organic layer 14 to give off light.

In general, the complexes disclosed in the present invention are utilized as either an electron transporting layer or an active emissive layer, or both in organic electroluminescent devices. When the disclosed complexes are used only as an electron transporting material of layer 15, an additional emissive material is needed to form layer 14. When the disclosed complexes are used only as the emissive material of layer 14, an additional electron transporting material is needed to form layer 15. When the disclosed complexes are used as both emissive and electron transporting material, layers 14 and 15 are generally combined into one layer.

In accordance with the present invention, organic layer 14 (the emissive layer) and/or 15 (the electron transporting layer) in organic EL device 10 are formed of at least one organometallic complex having a general formula as shown in the following:

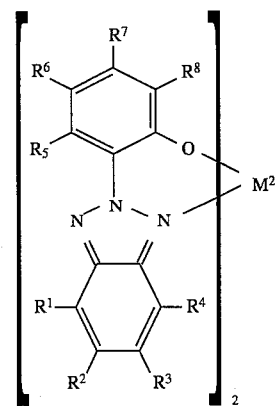

where:
 $M^2$ is a divalent metal ion; and
 $R^1$ to $R^8$ represent substitution possibilities at each position and each represent hydrogen or hydrocarbon groups or functional groups such as cyano, halogen, haloalkyl, haloalkoxy, alkoxyl, amido, amino, sulfonyl, carbonyl, carbonyloxy and oxycarbonyl etc.

The above complexes are generally prepared via the following reaction:

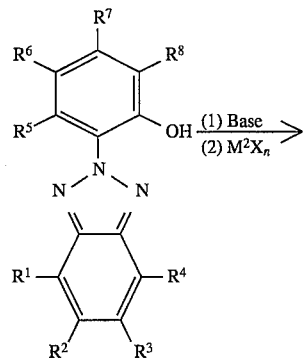

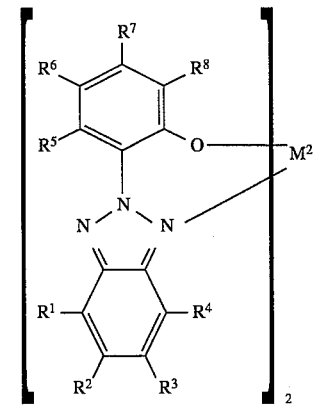

where:
 $M^2$ is a divalent metal ion;
 X is an anionic group including halides, sulfate, nitrate, etc.;
 n=1 or 2; and
 $R^1$ to $R^8$ represent substitution possibilities at each position and each represent hydrogen or hydrocarbon groups or functional groups.

In a typical reaction, ligand L is suspended in an alcoholic solvent such as methanol or ethanol, and is treated with one equivalent amount of base such as sodium hydroxide, sodium ethoxide, etc. under an inert atmosphere. After a homogeneous solution has been attained, ½ of an equivalent amount of divalent metal salt ($MX_n$, n=1 or 2) is added into the solution. The precipitation that forms is collected by filtration and further purified by sublimation.

It is well known from organic chemistry that ligand L, a triazole derivative, is an electron deficient system that has a high electron affinity. In the prior art, triazole derivatives have been used by Kido and coworker as an electron transporting layer in organic EL devices (Jpn. J. Appl. Phys. 1993,32, L917.). The complexes of triazole derivative L with metal ions have even higher electron affinity. They can be used as either an electron transporting layer or an active emissive layer, or both in organic electroluminescent devices.

Figure 2:
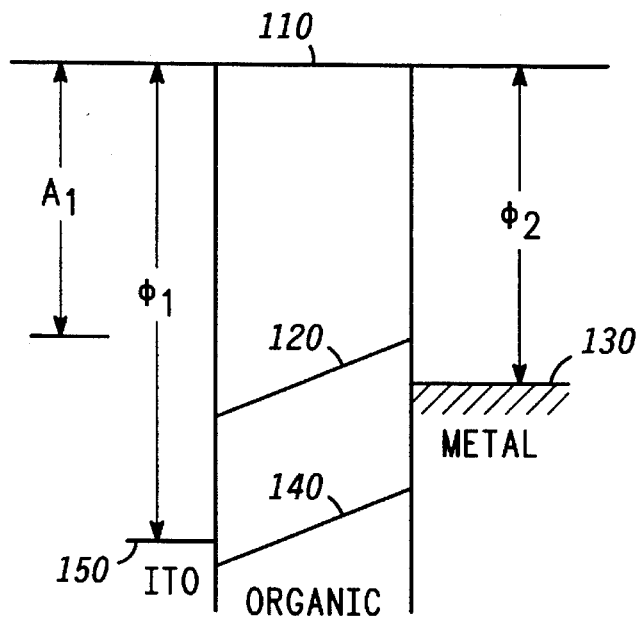
FIG. 2 illustrates a schematic energy-level diagram for a single layer organic EL device under forward bias.

FIG. 2 illustrates a schematic energy-level diagram for a single layer organic EL device under forward bias. Line 110 represents the vacuum level, lines 130 and 150 represent the Fermi levels of metal and ITO layers or contacts, and lines 120 and 140 represent the LUMO and HOMO of an organic complex. The $\phi_1$ and $\phi_2$ energy levels are the work functions of the ITO and metal contacts, while the A1 energy level is the electron affinity of the organic complex physically positioned between the ITO and metal contacts. The high electron affinity ($A_1$) means a low LUMO energy level that, in turn, reduces for electron injection the energy barrier ($\phi_2 - A_1$) between the n-type metal contact and the organic complex. The efficient electron injection produced by lowering the energy barrier, translates into higher luminescent efficiency and lower operating voltage in the organic EL devices.

Of the various ligands that satisfy the requirements of the invention, 2-(2'-hydroxy-5'-methylphenyl)benzo-triazole (TP) is the simplest and most commercially available material. TP forms complexes with many divalent metal ions such as $Be^{2+}$, $Mg^{2+}$, $Zn^{2+}$ to yield $Be(Tp)_2$, $Mg(Tp)_2$ and $Zn(Tp)_2$. These complexes are green fluorescent upon photo- or electro-excitation.

Organic layer 14 (the emissive layer) in organic EL device 10 (FIG. 1) is commonly deposited by thermal vapor deposition, electron beam evaporation, chemical deposition or the like. The emission peaks of the above embodied organometallic complexes when utilized in organic LEDs range from 510 nm to 560 nm, which are in the regions of green to greenish-yellow on the CIE 1931 chromaticity diagram.

EXAMPLES

This invention will be further described by the following examples, which are intended to illustrate specific embodiments of the invention but not to limit its scope.

Example 1

The following procedures for synthesis of $Be(Tp)_2$ can be used to prepare all the divalent metal complexes disclosed in this invention, except that metal chloride or nitrate salt, instead of metal sulfate salt, is used in some cases depending on the availability of the salts.

Procedure One

A mixture of 20 mmol of Tp (Ciba Geigy Company) in 80 mL of methanol is treated with 20 mmol of sodium hydroxide pellet (Fisher Scientific Company) under argon atmosphere. The mixture is stirred until all of the sodium hydroxide pellets are dissolved. The mixture is then added with 10 mmol of beryllium sulfate tetrahydrate (Aldrich Chemical Company). The resulting mixture is stirred at reflux for 16 hours and allowed to cool to room temperature. The yellow fluorescent solid is collected by filtration, washed with methanol, and dried under vacuum to afford $Be(Tp)_2$ in 78% yield.

Procedure Two

A solution of 12 mmol of sodium hydroxide (Fisher Scientific Company) in 60 mL of de-ionized water/methanol (1:1) mixture is added with 12 mmol of Tp (Ciba Geigy Company) under an inert atmosphere. The reaction mixture is warmed up with a water bath and stirred until a homogeneous solution is attained. To the solution is added dropwise through an addition funnel a solution of 6 mmol of beryllium sulfate tetrahydrate (Aldrich Chemical Company) in 20 mL of de-ionized water. The yellow fluorescent precipitation which results is filtered and washed with de-ionized water and methanol to yield $Be(Tp)_2$ in 85% yield after drying.

Example 2

The following procedure is used for the purification and characterization of the organometallic complexes produced and disclosed above.

The solid complex to be purified is placed into the sealed end of an one-end-sealed quartz tube which has been divided into several zones that are connected together with ground joints. The quartz tube is then inserted into a one-endedsealed Pyrex tube which has been connected to a vacuum system. The sealed end of the quartz tube is in contact with the sealed end of the Pyrex tube. The Pyrex tube is then evacuated to $10^{-6}$ torr with a diffusion pump and the sealed end of the Pyrex tube is heated in a tube furnace. The pure product is sublimed into different zones than volatile impurities in the quartz tube and purification thus is achieved. The sublimation temperature ranges from 250° C. to 350° C. depending on the complexes.

In general, the complex prepared from procedure one described in Example 1 offers better overall yields then procedure two after sublimation.

The pure complexes are analyzed and characterized by ultraviolet-visible, infrared, photoluminescence spectra as well as elemental analyses. This provides confirmation for the structures and compositions of the desired complexes.

Thus, a class of new organometallic complexes for use in light emitting devices has been disclosed, along with preparation methods for the disclosed organometallic complexes and methods of fabrication of light emitting devices. The new organometallic complexes have been utilized as either an electron transporting layer or an active emissive layer, or both in organic EL devices.

While I have shown and described specific embodiments of the present invention, further modifications and improvements will occur to those skilled in the art. I desire it to be understood, therefore, that this invention is not limited to the particular forms shown and I intend in the appended claims to cover all modifications that do not depart from the spirit and scope of this invention.

What is claimed is:

1. An organic light emitting device comprising:

a first conductive layer;

a layer of first carrier transporting and second carrier blocking material positioned on the first conductive layer;

a layer of organometallic material positioned on the layer of first carrier transporting and second carrier blocking material and having the following general formula:

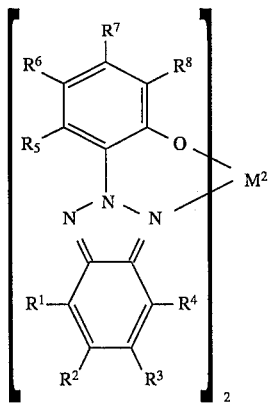

where:

$M^2$ is a divalent metal ion, and $R^1$ to $R^8$ represent substitution possibilities at each position and each represent hydrogen or hydrocarbon groups or functional groups;

a layer of second carrier transporting and first carrier blocking material positioned on the layer of organometallic material; and a second conductive layer positioned on the layer of second carrier transporting and first carrier blocking materials.

2. An organic light emitting device as claimed in claim 1 wherein the first carriers are holes and the second carriers are electrons.

3. An organic light emitting device as claimed in claim 1 wherein the first conductive layer is p conductivity and the second conductive layer is n conductivity.

4. An organic light emitting device as claimed in claim 1 wherein one of the first and second conductive layers are transparent to light emitted by the organometallic emissive layer.

5. An organic light emitting device comprising:

a glass substrate having a substantially planar surface;

a first conductive transparent layer positioned on the glass substrate a layer of hole transporting and electron blocking material positioned on the first conductive layer;

a layer of organic active emitter material deposited on the hole transporting and electron blocking layer;

a layer of organometallic complex material positioned on the layer of organic active emitter material as electron transporting and hole blocking material, the organometallic complex material having the general formula:

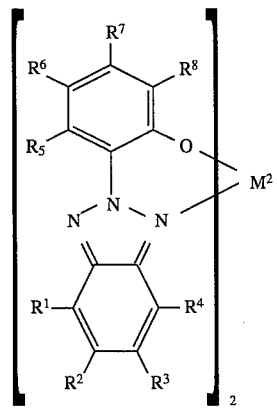

where:

$M^2$ is a divalent metal ion, and $R^1$ to $R^8$ represent substitution possibilities at each position and each represent hydrogen or hydrocarbon groups or functional groups; and a second conductive layer positioned on the layer of organometallic complex material.

* * * * *